May 31, 1932.  H. L. SCHRECK  1,861,364
UNIVERSAL JOINT
Filed Dec. 4, 1929   2 Sheets-Sheet 1
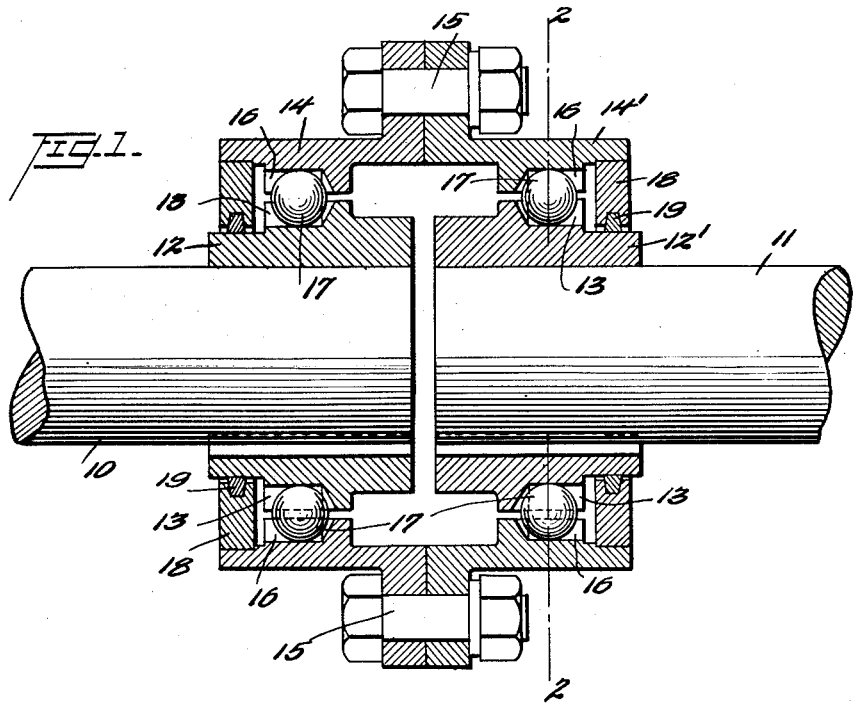
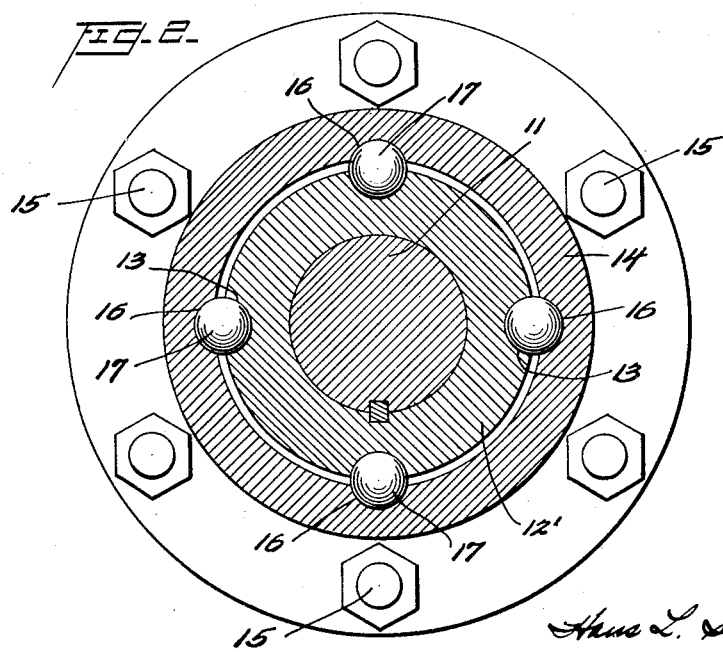

May 31, 1932. H. L. SCHRECK 1,861,364
UNIVERSAL JOINT
Filed Dec. 4, 1929 2 Sheets-Sheet 2
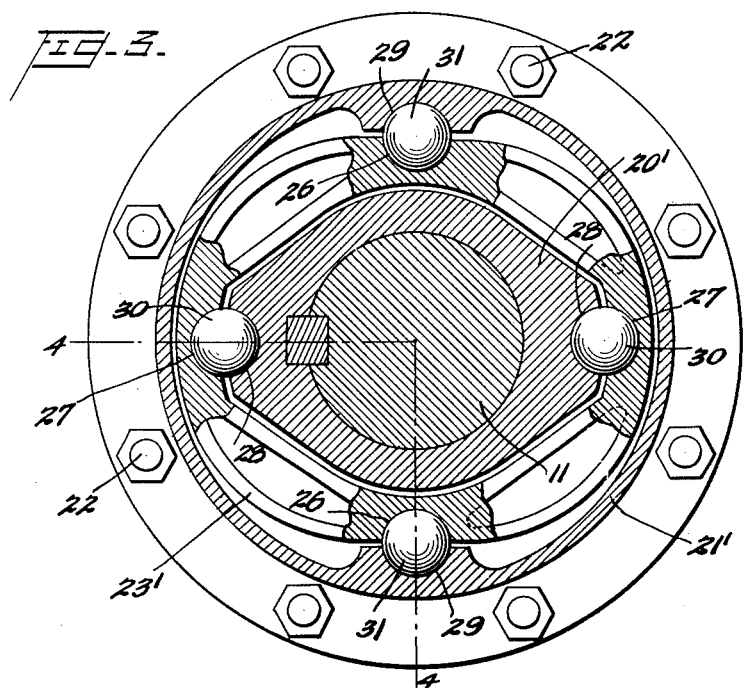
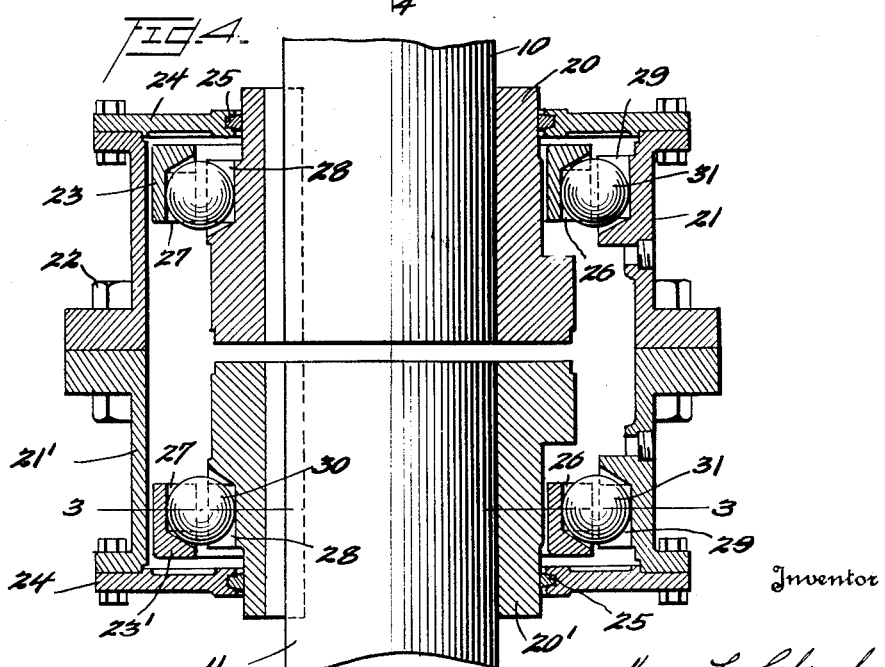

Patented May 31, 1932

1,861,364

UNITED STATES PATENT OFFICE

HANS L. SCHRECK, OF EASTON, PENNSYLVANIA, ASSIGNOR TO TREADWELL ENGINEERING COMPANY, OF EASTON, PENNSYLVANIA, A CORPORATION OF PENNSYLVANIA

UNIVERSAL JOINT

Application filed December 4, 1929. Serial No. 411,598.

This invention relates to shaft couplings and particularly to flexible, or universal, couplings.

The general object of the invention is to provide a universal shaft coupling which is strong and simple in construction and durable and efficient in use. The invention contemplates a novel form of coupling which comprises essentially a sleeve-like member which encircles the adjacent ends of two shafts to be coupled together, and means for connecting each shaft end to said member which permits of universal movement between such shaft and member. Many important improvements in detail are also included in the improved coupling, which is so designed and constructed that power may be transmitted from one shaft to another with a minimum of friction losses, though there may be considerable misalignment or angular displacement.

The invention may have various embodiments, and in the accompanying drawings two such embodiments are set forth by way of example.

Referring to the drawings:

Figure 1 is a longitudinal section through a shaft coupling in which one form of the invention is embodied;

Figure 2 is a sectional view taken on the line 2—2 of Fig. 1;

Figure 3 is a sectional view of a coupling embodying a modified form of the invention, taken on the line 3—3 of Fig. 4; and Figure 4 is a sectional view taken on the line 4—4 of Fig. 3.

In the form of the invention shown in Figures 1 and 2, the adjacent ends of two shafts to be connected are indicated at 10 and 11, and splined or otherwise fixed to the ends of these shafts, respectively, are hubs 12 and 12' of identical form. The central portion of each hub is externally thickened or flanged, and four cylindrical notches 13 are formed therein, the axes of which are parallel to the axis of the hub, equidistant therefrom and equally spaced from each other. Adjacent notches, therefore, are spaced 90° apart, and the two planes respectively including the axes of the two pairs of diametrically opposed notches intersect at right angles on a line which is coincident with the axis of the hub. As indicated in Figure 1, the notches are open at their outer ends and are formed with conical inner end walls.

Surrounding the hubs 12 and 12' is a shell formed of two complementary halves 14 and 14' having abutting flanges which are detachably secured together by bolts 15. Each of the portions 14, 14' of the shell is formed with an inwardly projecting enlargement, flange, or annulus, which is opposed to the thickened portion of the corresponding hub and in which are formed four equidistant cylindrical notches 16, respectively, opposite the notches 13 and complementary thereto. Seated in the cylindrical sockets formed by the mutually facing notches 13 and 16 are steel balls 17, the radius of curvature of each ball being substantially equal to that of the socket in which it is contained, so that the balls may be said to fit snugly within their respective sockets. By this arrangement the torque of the drive shaft can be transmitted to the driven shaft without rattling of the parts, even upon reversal of movement of the drive shaft, even when the shafts are somewhat out of alignment.

Detachably secured in the ends of the shell are flat steel rings 18 having grooved edges in which are secured felt packing rings 19 which bear on the hubs and thereby prevent leakage of the lubricant which normally fills the interior spaces of the coupling.

The above described construction provides a coupling which permits small angular movements of the shafts 10 and 11 with respect to each other, in all planes. Each shaft with its attached hub can be deflected with respect to the shell a slight degree from aligned position about the two axes which respectively pass through the centers of the two diametrically opposite balls 17; that is, each shaft is permitted a small maximum universal deflection from a central aligned position with respect to the shell, and the total maximum misalignment permitted between the shafts will be the sum of these two deflections.

Figures 3 and 4 illustrate a modified form of coupling, which is somewhat more flexible than the form first described and is therefore to be preferred where the shafts to be connected are considerably out of alignment. As in the form first described, this embodiment of the invention comprises two hubs 20 and 20' respectively splined on the opposed ends of shafts 10 and 11, and a shell including two complementary halves 21 and 21' having abutting flanges which are detachably secured together by bolts 22, but in addition to these elements it includes two rings 23, 23' interposed respectively between the hub 20 and shell member 21 and the hub 20' and shell member 21'. The shell members 21, 21' are also flanged at their outer ends, and bolted thereto are annular plates 24 having grooved inner edges in which are seated felt packings 25, whereby the lubricant filling the coupling is retained.

The rings 23 and 23' are of identical form and construction. A side view of the ring 23 is shown in Figure 3, and it will be observed that it has an oblate form and is provided with outwardly facing cylindrical ball seats 26 at the ends of its shorter diameter and with similar but inwardly facing seats 27 centered on its larger diameter. Complemental to the inwardly opening seats 27 are seats 28 formed at diametrically opposite points on the hubs 20 and 20'; and complemental to the outwardly opening seats 26 are seats 29 formed at diametrically opposite points on the shell members 21 and 21'. Balls 30 are retained in the seats 27, 28, and balls 31 are retained in the seats 26, 29.

It will be clear from the described construction that either shaft with its attached hub can swing with respect to the ring 23 or 23', as the case may be, about an axis which passes through the centers of the balls 30, while the ring can swing with respect to the shell about an axis which passes through the centers of balls 31. Since these two axes are at right angles to each other, it follows that either shaft can swing universally with respect to the shell and, of course, with respect to each other. The connection of the shaft to the shell through the ring will be recognized as the well known gimbal mounting. It will be understood, therefore, that each shaft is connected to the shell by an individual universal coupling which freely permits angular deflections of the shaft with respect to the shell in all planes, the deflections being limited only by the clearances between the shell, hub and ring.

Various changes in the specific constructions described can, of course, be made without departing from the scope of the invention as defined in the claim.

Having thus described the invention, what is claimed as new and desired to be secured by Letters Patent is:

A universal shaft coupling comprising two hubs respectively attached to the opposed ends of a pair of shafts, each of said hubs having one diameter of greater length than the diameter perpendicular thereto, a shell surrounding said hubs, a ring of substantially elliptical form between each of said hubs and said shell, inwardly opening ball seats at opposite ends of the larger diameter of said ring and outwardly opening ball seats at opposite ends of its smaller diameter, outwardly opening seats formed in said hubs at the ends of their longer diameters which are complemental to the inwardly opening seats of said ring and inwardly opening seats formed in said shell which are complemental to the outwardly opening seats of said ring, and balls disposed in said seats, the dimensions of all of said parts being such that all of the balls of said joint are equally spaced from the axis thereof.

In testimony whereof I hereunto affix my signature.

HANS L. SCHRECK.